United States Patent [19]
Mason

[11] Patent Number: 5,536,136
[45] Date of Patent: Jul. 16, 1996

[54] MECHANICAL LOADER

[75] Inventor: Arthur C. Mason, Harrison Township, Mich.

[73] Assignee: Utica Enterprises, Inc., Shelby Township, Mich.

[21] Appl. No.: 191,670

[22] Filed: Feb. 3, 1994

[51] Int. Cl.$^6$ ................................................. B65G 65/00
[52] U.S. Cl. ........................... 414/749; 74/52; 198/468.6
[58] Field of Search .................................... 414/749, 733, 414/917; 901/23, 25; 74/52, 490.03; 198/468.6

[56] References Cited

U.S. PATENT DOCUMENTS

| | | |
|---|---|---|
| 1,072,834 | 9/1913 | Devlin . |
| 1,173,478 | 2/1916 | Beardshaw . |
| 1,590,902 | 6/1926 | Natisch . |
| 2,309,407 | 1/1943 | McBeath . |
| 2,676,799 | 4/1954 | Fletcher . |
| 3,554,363 | 2/1968 | Elineau . |
| 3,857,292 | 12/1974 | Brems . |
| 3,902,606 | 9/1975 | Ronbeck . |
| 4,018,090 | 4/1977 | Brems . |
| 4,046,633 | 8/1977 | Lee . |
| 4,137,797 | 2/1979 | Brems . |
| 4,223,568 | 9/1980 | Brems . |
| 4,400,984 | 8/1983 | Ronbeck . |
| 4,411,587 | 10/1983 | Niki . |
| 4,530,637 | 7/1985 | Mason et al. . |
| 4,585,389 | 4/1986 | Watanabe et al. . |
| 4,589,819 | 5/1986 | Shirao . |
| 4,634,338 | 1/1987 | Tsuge et al. . |
| 4,740,134 | 4/1988 | Dixon . |
| 4,796,477 | 1/1989 | Brems . |
| 4,801,235 | 1/1989 | Rauschdorf . |

*Primary Examiner*—Donald W. Underwood
*Attorney, Agent, or Firm*—Remy J. VanOphem; John VanOphem

[57] ABSTRACT

A mechanical loading device capable of generating a substantially rectilinear output motion for the purpose of transporting workpieces between work stations. The mechanical loading device is capable of producing the rectilinear output motion such that a workpiece is lifted, transferred horizontally, and then lowered into position with a significant degree of precision. The rectilinear output motion is generated primarily by a carrier on which a yoke is supported with an eccentric shaft extending from a driven member mounted to the carrier. The eccentric relationship between the driven member and the yoke, in conjunction with the controlled rotation of the carrier, generates the rectilinear output motion at an output member supported by the yoke. The mechanical loading device is structurally strong and compact, is constructed so as to be readily maintainable, and enables the efficient conversion of a rotational input motion to the desired rectilinear output motion.

20 Claims, 3 Drawing Sheets

MECHANICAL LOADER

BACKGROUND OF THE INVENTION

1. Field of the Invention

The present invention generally relates to mechanical loading devices of the type employed to raise, transport, and lower workpieces in a manufacturing setting. More specifically, this invention relates to a mechanical loading device capable of producing a substantially rectilinear output motion from a rotational input, such that the output motion is reversible and can be controllably accelerated and decelerated as desired.

2. Description of the Prior Art

Mechanical loaders are widely used in manufacturing to move workpieces between work stations, and to and from conveyor belts. Generally, such mechanical loaders must be capable of a substantially rectilinear output motion which includes a vertical movement in order to clear the surfaces on which the workpieces are positioned, and a horizontal movement during which the workpieces are transferred from one station to the next. While significant variations in the precise output motion required can exist, many mechanical loaders rely on a rotational input from which their rectilinear output motion is derived. As one would expect, the availability of electric motors capable of being accurately controlled in forward and reverse directions makes rotational input to mechanical loaders highly desirable.

Apart from these general characteristics noted above, numerous mechanical loader designs are known and available in the prior art. One such example is U.S. Pat. No. 4,137,797 to Brems. Brems teaches a prime mover mechanism which generates a substantially square output motion from a rotational input. To do so, Brems relies on a planetary gear system in which an eccentric shaft extending from a planet gear provides the desired rectilinear motion. The eccentric shaft exhibits four distinct acceleration-deceleration cycles as it proceeds along its square output path due to the rotation of the planet gear relative to the frame.

While the device taught by Brems is capable of efficiently producing a rectilinear output motion from a rotational input motion, a disadvantage with the device is the reliance on a planetary gear system to transform the rotational input to the rectilinear output. As a result, a large mass must be rotated in a manner that may create significant eccentric loads. The inertial mass of the planetary gear system also tends to make it difficult to quickly pause the device in midmotion, a requirement which arises if only a portion of the square output motion is required to properly transport a workpiece to and from a station. Finally, the output motion produced by the eccentric shaft does not extend laterally beyond the perimeter of the device's structure, such that the device may require excessive floor space in order to suitably transport a workpiece between work stations.

A loading device which is specifically structured to produce a rectilinear output motion consisting of a lift, transport and lower movement is taught in U.S. Pat. No. 4,400,984 to Ronbeck. Contrary to Brems, Ronbeck relies on a parallelogram linkage arrangement in order to produce the desired rectilinear output motion. As such, the loading device taught by Ronbeck is capable of generating the desired output motion outside of its main structure, and further has the potential for being lighter in weight and easier to maintain than the planetary gear system of Brems. However, Ronbeck utilizes an air cylinder as the input device by which a crank is pivoted to produce the rectilinear output motion of the loading device, such that the overall structural and handling capabilities of the loading device are somewhat limited by the nature of the air cylinder, and the degree to which it can be accurately controlled.

From the above discussion, it can be appreciated that the prior art teaches diverse mechanisms by which a rectilinear output motion is generated that can be utilized to load and unload workpieces from a work station. However, it can also be appreciated that certain desirable characteristics, such as precision and control of the motion, and compactness and maintainability of the device are somewhat difficult to achieve within a single mechanism. More specifically, it would be desirable to provide a mechanical loader which is more compact so as to minimize the floor space required to accommodate it, readily maintainable in order to promote reliability and a long service life, and offers a highly controllable output such that workpieces can be accurately transferred between stations in order to enhance throughput and the overall efficiency of the manufacturing process.

Accordingly, what is needed is a cost-efficient, compact and readily maintainable mechanical loading device whose output is characterized by a precision rectilinear motion that is generated by a rotational input motion, the mechanical loading device providing a rigid transfer structure capable of handling large workpieces.

SUMMARY OF THE INVENTION

According to the present invention there is provided a mechanical loading device which is capable of generating a rectilinear output motion for the purpose of transporting workpieces between work stations. The mechanical loading device is capable of producing the rectilinear output motion such that a workpiece can be lifted, transferred horizontally, and then lowered into position with a significant degree of precision. Furthermore, the mechanical loading device is structurally strong, and utilizes a readily maintainable mechanism which makes possible the efficient conversion of a rotational input motion to the desired rectilinear motion. In addition, the mechanical loading device is relatively compact, requiring minimal floor space so as to be readily accommodated between work stations on a processing line.

The mechanical loading devices includes a stationary drive member which is rigidly supported by a suitably rigid frame. A carrier member is rotatably supported by the frame in proximity to the stationary drive member, and a suitable input device is provided by which the carrier member is rotated. A driven member, such as a pulley, is rotatably supported on the carrier member and is in mechanical communication with the stationary drive member in any suitable manner, such as with a drive belt. As a result, the driven member rotates relative to the carrier member when the carrier member is rotated.

A first support member is eccentrically mounted to the driven member relative to the driven member's axis of rotation, such that the first support member follows a circular path relative to the driven member when the driven member is rotated. A second support member is supported on the mechanical loading device so as to be linearly displaceable relative to the carrier member. Finally, an output member is mounted to the first and second support members. The output member has a first portion rotatably mounted to the second support member and a second portion rotatably mounted to the first support member, such that a third portion of the output member travels along a substantially rectilinear path as the carrier member is rotated.

More specifically, when the carrier member is rotated between a first and second angular position of roughly 180 degrees apart, the third portion of the output member will travel through a first leg of the rectilinear motion corresponding to a lifting phase, followed by a second leg of the rectilinear motion by which the third portion moves substantially perpendicular to the first leg during a transporting stage, and then moves along a third leg substantially parallel to the first leg, during which the third portion of the output member is lowered.

According to a preferred aspect of this invention, the rectilinear output motion is generated primarily by the eccentric relationship between the first support member and the driven member as a result of the driven member being rotated on the carrier member about the carrier member's axis of rotation. Specifically, the stationary drive member is sized to have a diameter approximately four times greater than the diameter of the driven member, such that the driven member will rotate approximately once during each 90 degrees of angular rotation of the carrier member. By appropriately synchronizing the angular position of the first support member on the driven member with the angular position of the carrier member, a substantially rectilinear output motion is generated.

Further, by controlling the rotation of the carrier member with a reversible rotational input, such as with a reversible motor, the rectilinear output motion of the mechanical loading device can be repeated along the same path, with the terminal points of the path being accurately determined by appropriately controlling the reversible motor.

From the above, it can be seen that significant advantages of the present invention include the ability of the mechanical loading device to generate from a rotational input a highly controllable rectilinear output motion by which workpieces can be loaded, and unloaded from a work station. The mechanical loading device is also relatively compact and maintainable, and provides a rigid transfer structure capable of transporting large workpieces.

Accordingly, it is an object of the present invention to provide a mechanical loading device for generating a substantially rectilinear output motion by which workpieces can be transferred between work stations.

It is a further object of the invention that the mechanical loading device utilize a rotational input from which the rectilinear output motion is generated and can be accurately controlled.

It is still a further object of the invention that the mechanical loading device include a relatively uncomplicated mechanism by which the rotational input is converted to the rectilinear output motion.

It is another object of the invention that the mechanical loading device include an output member which is structurally strong and rigid so as enable precision loading and unloading of relatively large workpieces.

It is yet another object of the invention that the mechanical loading device be relatively compact so as to require minimal floor space.

Other objects and advantages of this invention will be more apparent after a reading of the following detailed description taken in conjunction with the drawings provided.

DETAILED DESCRIPTION OF THE PREFERRED EMBODIMENT

Figure 1:
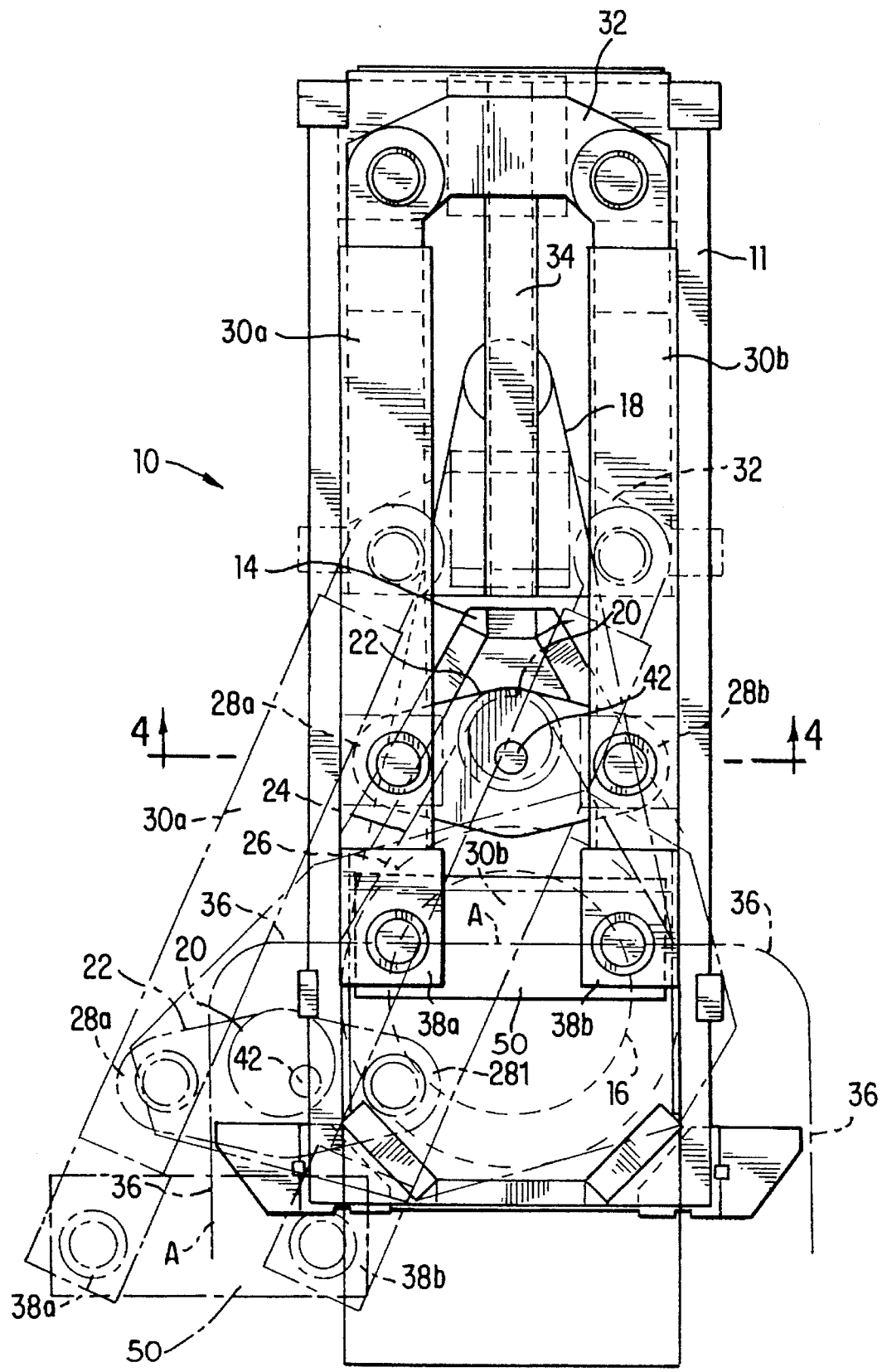
FIG. 1 is a frontal view of a mechanical loader in accordance with the preferred embodiment of this invention.
Figure 2:
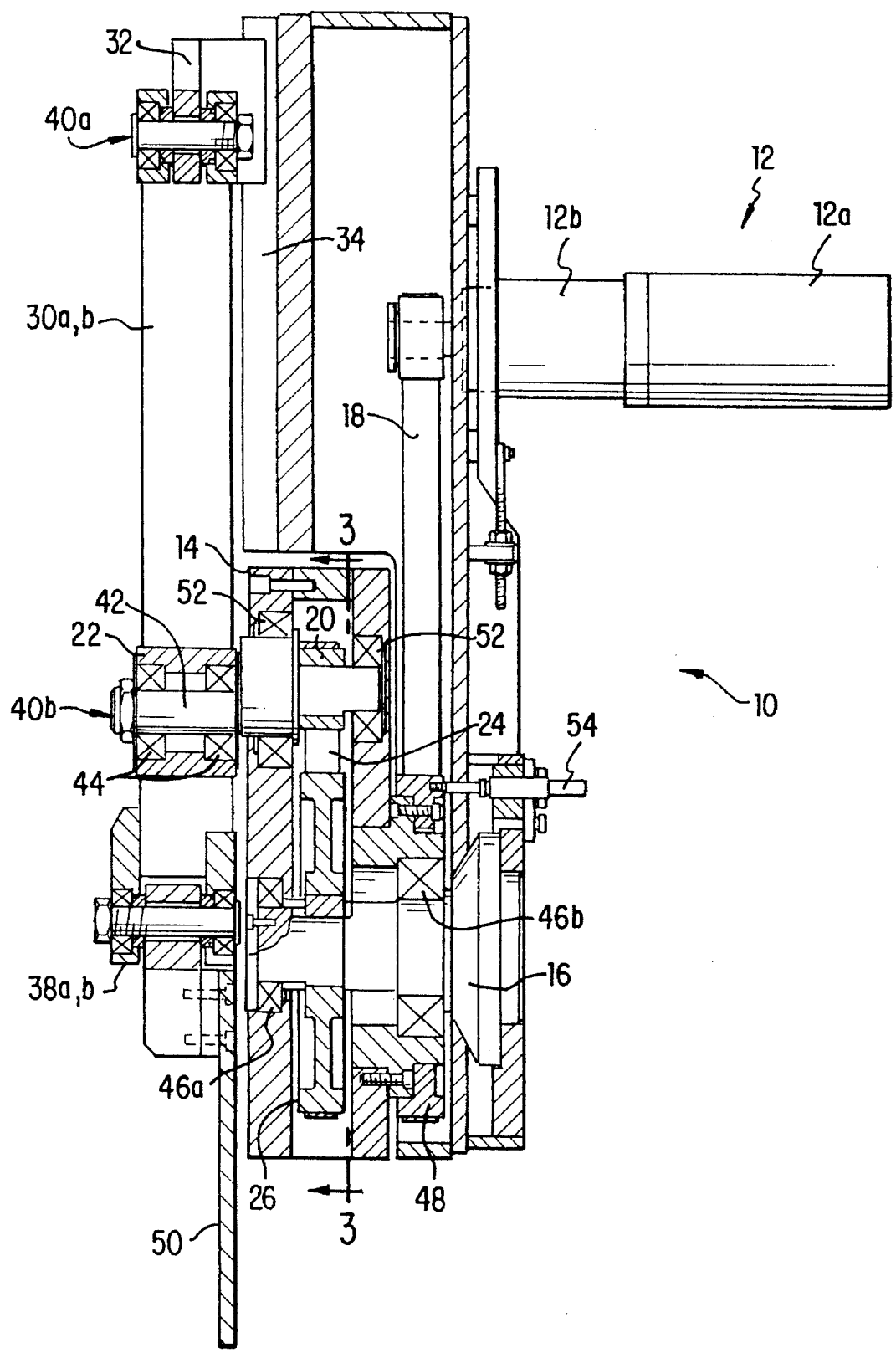
FIG. 2 is a cross-sectional side view of the mechanical loader of FIG. 1.

With reference to FIGS. 1 and 2, there is shown a mechanical loader 10 in accordance with this invention. As illustrated, the mechanical loader 10 represents a device by which workpieces can be transferred between work stations at which work is performed on the workpieces. Generally, the mechanical loader 10 is an upright structure which includes a frame 11 on which is mounted a carrier 14 and a pair of arms 30a and 30b. The carrier 14 is generally a structural enclosure capable of rotating relative to the frame 11. In accordance with a particular feature of this invention, the mechanical loader 10 is configured such that a midpoint "A" between lower ends 38a and 38b of the arms 30a and 30b, respectively, travels along a rectilinear path 36 during the operation of the mechanical loader 10. As such, an attachment or load handler, a portion of which is represented by reference numeral 50 in FIGS. 1 and 2, can be secured to the lower ends 38a and 38b of the arms 30a and 30b by which workpieces can be transported.

As shown in solid lines in FIGS. 1 and 2, the mechanical loader 10 is in a null position, meaning the arms 30a and 30b are drawn up against the frame 11 and the midpoint "A" is located at a midpoint along the rectilinear path 36. During operation, the arms 30a and 30b are articulated by having their upper ends being rotatably mounted to an upper yoke 32, and their lower ends 38a and 38b being rotatably secured to a lower yoke 22. As shown in FIG. 2, the arms 30a and 30b can be secured to the upper and lower yokes 32 and 22 with pin and bearing assemblies 40a and 40b, respectively. The upper yoke 32 is slidably secured to a guide column 34 attached to the frame 11 with any suitable device, such as rollers (not shown), such that the upper yoke 32 is able to reciprocate in a vertical direction along the length of the guide column 34. The lower yoke 22 is rotatably mounted to the carrier 14 in a manner which will be discussed in greater detail below. The lower yoke 22 is maintained in a horizontal orientation as a result of its opposite ends 28a and 28b being rotatably secured to the arms 30a and 30b with the pin and bearing assembly 40b.

Figure 3:
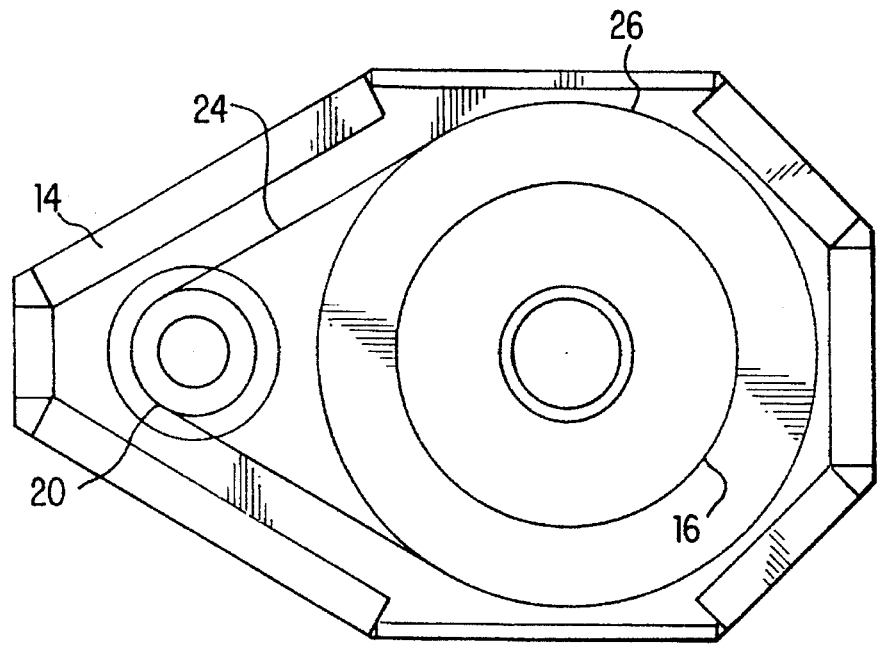
FIG. 3 is a cross-sectional view of a carrier member of the mechanical loader along line 3—3 of FIG. 2.

The desired rectilinear path 36 for the mechanical loader 10 of this invention is made possible by a mechanism which includes as its primary elements a driven pulley 20 and a stationary drive pulley 26, both of which are mounted within the carrier 14, as can be seen in FIGS. 2 and 3. The carrier 14 is rotatably supported with two pairs of bearings 46a and 46b on a stationary shaft 16 mounted to the frame 11, while the stationary drive pulley 26 is keyed to the stationary shaft 16 so as to prevent its rotation. The carrier 14 has a pulley 48 mounted thereto by which the carrier 14 can be selectively rotated by a primary drive belt 18 driven by a drive 12. As is known in the art, the primary drive belt 18 can be any one of various types of friction drives, such as rubber or metal belts, or a chain. Furthermore, one skilled in the art may recognize certain situations in which it is possible or preferable to mechanically drive the carrier 14 through a pair of meshing gears.

In accordance with this invention, the drive 12 preferably includes a variable speed, reversible servomotor 12a and a speed reducer 12b. The servomotor 12a is of a type known and commercially available, such as Model MAC71C2US from Indramat, while the speed reducer 12b is preferably capable of a 50:1 speed reduction ratio in order to boost the torque output of the servomotor 12a while also enhancing the angular positional control of the carrier 14 with the servomotor 12a. Importantly, accurate speed control of the servomotor 12a is also desirable in order to closely control the position of the carrier 14 and promote the efficiency of the mechanical loader 10. Those skilled in the art will recognize that numerous other servomotors and speed reducers are available which will provide a suitable combination for achieving the performance characteristics of the mechanical loader 10 of this invention.

Referring to FIGS. 2 and 3, the driven pulley 20 is driven by the stationary drive pulley 26 with a belt 24. As with the primary drive belt 18, the belt 24 may be any one of various types of friction drives, such as rubber or metal belts, or a chain. As noted before, the driven pulley 20 and the stationary drive pulley 26 are both mounted within the carrier 14. Because the carrier 14 is rotatably supported on the stationary shaft 16, the stationary drive pulley 26 is keyed to the stationary shaft 16, and the driven pulley 20 is mechanically coupled to the stationary drive pulley 26 with the belt 24. Rotations of the carrier 14 on the stationary shaft 16 causes the driven pulley 20 to rotate relative to the carrier 14 in a direction opposite to the rotation of the carrier 14 and at a rate determined by the diameter ratio of the stationary drive pulley 26 to the driven pulley 20.

Figure 4:
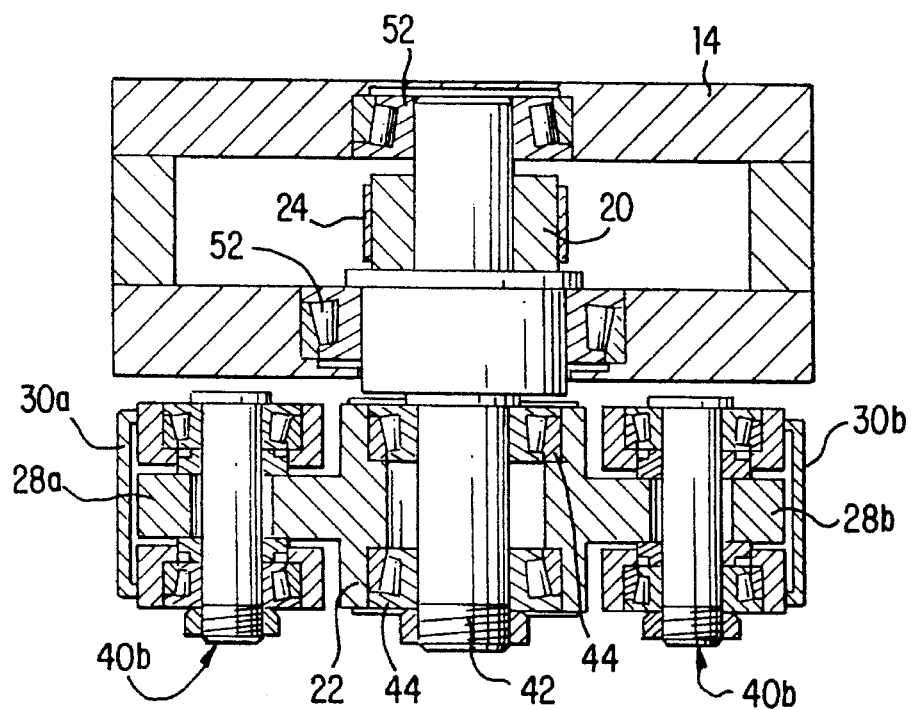
FIG. 4 is a cross-sectional view of the mechanical loader along line 4—4 of FIG. 1.

As seen in FIGS. 2 and 4, the driven pulley 20 is mounted to the carrier 14 with a pair of bearings 52 so as to be freely rotatable therewith. Extending from the driven pulley 20 is an eccentric shaft 42 which is rotatably received in the lower yoke 22 by a pair of bearings 44. It is the eccentric relationship between the driven pulley 20 and the lower yoke 22, in conjunction with the controlled rotation of the carrier 14, which generates the desired rectilinear output motion at the arms 30a and 30b. The distance by which the eccentric shaft 42 must be offset from the axis of rotation of the driven pulley 20 in order to produce the rectilinear path 36 for the mechanical loader 10 is dictated by the distance between centers of the driven pulley 20 and the stationary drive pulley 26. Roughly a 1:10 ratio between these distances is necessary such that, as the carrier 14 rotates, the offset of the eccentric shaft 42 will compensate for the circular path of the driven pulley 20, such that the center of the eccentric shaft 42 will traverse a substantially rectilinear path, thereby dictating the rectilinear path 36 for midpoint "A" between the arms 30a and 30b. In order to achieve the above, the ratio between the diameters of the stationary drive pulley 26 and the driven pulley 20 must be approximately 4:1, such that the driven pulley 20 will,rotate approximately once during each 90 degrees of angular rotation of the carrier 14. By appropriately synchronizing the angular position of the lower yoke 22 relative to the axis of rotation of the driven pulley 20 with the angular position of the carrier 14 relative to the frame 11, the rectilinear path 36 is generated. This relationship can be visualized from FIG. 1.

In operation, the servomotor 12a is energized as necessary to operate and control the mechanical loader 10. A programmable controller (not shown) of a type well known in the art can be employed to regulate the operation of the servomotor 12a, including the durations over which the servomotor 12a is on and off, as well as its direction of rotation. At the null position shown in FIG. 1, the upper yoke 32 is at its extreme upper position on the guide column 34 and the lower yoke 22 is at its extreme upper position, being centered directly above the carrier 14. In addition, the eccentric shaft 42 on which the lower yoke 22 is supported and pivoted is directly below the axis of rotation Of the driven pulley 20, as shown.

From the null position, the servomotor 12a is energized to rotate the carrier 14 through its pulley 48. The carrier 14 will be rotated from its generally vertical orientation at null, toward a generally horizontal position and, as shown in phantom in FIG. 1, may continue past horizontal in order to achieve sufficient vertical travel of the ends 38a and 38b of the arms 30a and 30b. As the carrier 14 moves from null, the driven pulley 20 will rotate counter to the direction of rotation of the carrier 14, causing the eccentric shaft 42 to rotate about the axis of rotation of the driven pulley 20. Due to the ratio of the diameters of the stationary drive pulley 26 and the driven pulley 20, the driven pulley 20 will complete one full rotation with each 90 degrees which the carrier 14 rotates.

Furthermore, due to the offset of the eccentric shaft 42 to the axis of rotation of the driven pulley 20, the eccentric shaft 42 will maintain a substantially horizontal course until the carrier 14 approaches roughly 45 degrees from null. At that point, the eccentric shaft 42 will begin an arcuate transition from its horizontal course to a vertical course. Again, the vertical course of the eccentric shaft 42 is maintained with further rotation of the carrier 14 due to its offset from the axis of rotation of the driven pulley 20. This vertical course is maintained as the carrier 14 passes through a substantially horizontal orientation, until the carrier 14 is nearly 135 degrees from null.

The servomotor 12a can be de-energized at any time during the above operation in order to limit the vertical or horizontal travel of the eccentric shaft 42, and reversed in order to retrace the above operation in a substantially identical but reverse manner. To provide feedback, a position sensor 54, such as a proximity sensor, can be mounted as shown to the rear of the frame 11 in order to detect the angular orientation of the carrier 14 during the operation of the mechanical loader 10. Due to the variable speed capability of the preferred servomotor 12a, the rotation of the carrier 14 can also be selectively accelerated and decelerated in order to optimize the efficiency of the mechanical loader 10.

Throughout the above, the lower yoke 22 and, therefore, the lower ends 38a and 38b of the arms 30a and 30b, have followed the course tracked by the eccentric shaft 42. As the carrier 14 has moved away from null, the upper yoke 32 has been forced to descend along the length of the column 34, as indicated in phantom in FIG. 1. In doing so, the midpoint "A" between the lower ends 38a and 38b of the arms 30a and 30b generates the rectilinear path 36, which is characterized by a horizontal leg, followed by an arcuate portion which redirects the rectilinear path 36 toward a vertical leg. Consequently, a workpiece interconnected to the lower ends 38a and 38b of the arms 30a and 30b will traverse along a rectilinear path corresponding to the rectilinear path 36. By properly programming the direction and duration of rotation for the servomotor 12a, the distance which a workpiece is raised, transported horizontally, and then lowered can all be predetermined with a great degree of precision.

From the above it can be seen that a significant advantage of the mechanical loader 10 of the present invention is that by selectively energizing and de-energizing the servomotor 12a, the lower ends 38a and 38b of the arms 30a and 30b can be manipulated to travel along a rectilinear path 36 between two work stations at which sequential work is performed on a workpiece. The distance which the workpiece must be raised or lowered to appropriately clear each work station can be independently and accurately controlled through programming the servomotor 12a. Consequently, the mechanical loader 10 can be readily adapted to perform a precision pick and place operation between adjacent work stations without requiring any mechanical adjustment. Furthermore, the mechanical loader 10 can be appropriately sized to accommodate a wide range of distances between work stations by altering the distance between centers of the driven pulley 20 and the stationary drive pulley 26, and the distance by which the eccentric shaft 42 is offset from the axis of rotation of the driven pulley 20.

Another significant advantage of the present invention is that the lower ends 38a and 38b of the arms 30a and 30b are highly rigid and stable throughout the operation of the mechanical loader 10. In particular, the upper and lower yokes 32 and 22 serve to provide sufficient support for the arms 30a and 30b so as to permit the handling of large workpieces, while also cooperating to generate the desired rectilinear motion at the lower ends 38a and 38b of the arms 30a and 30b. Accordingly, no additional linkages are necessary in order to articulate or stabilize the arms 30a and 30b during the operation of the mechanical loader 10.

In addition, the construction of the mechanical loader 10 results in a substantially vertical structure which is compact, requiring minimal floor space. The mechanical loader 10 is structured to be readily maintainable, with mechanical movement being made through bearings which can be selected to achieve long service life, while also being readily replaceable when necessary. In addition, the use of the friction drive system of this invention avoids the use of gear drive systems which are susceptible to tooth wear, leading to excessive backlash that is detrimental to precision movement.

While the invention has been described in terms of a preferred embodiment, it is apparent that other forms could be adopted by one skilled in the art. For example, the mechanical loader 10 could be configured to allow it to be oriented other than vertically so as to permit its use in various positions between work stations, the general shape of the components and the manner in which they are interconnected could be other than that shown and described, and other devices for rotating the carrier 14 could be readily adopted by those skilled in the art to achieve the operation of the mechanical loader 10 as described. Additionally, the mechanical loader 10 could be employed for purposes other than transporting workpieces, in that the mechanical loader 10 of this invention is capable of precisely and efficiently positioning a wide variety of objects for various operations and applications. Accordingly, the scope of the invention is to be limited only by the following claims.

What is claimed is:

1. A device for generating an output having a predetermined path, said device comprising:

a stationary drive member;

a carrier member rotatably supported in proximity to said stationary drive member;

means for rotating said carrier member, said means for rotating being connected with said carrier member;

a driven member rotatably supported on said carrier member, said driven member connected with said stationary drive member such that said driven member rotates relative to said carrier member when said carrier member is rotated by said rotating means;

a first support member eccentrically secured to said driven member;

a second support member slidably mounted proximate said carrier member and displaced relative to said carrier member; and an output member having a first portion rotatably mounted to said second support member and a second portion rotatably mounted to said first support member, such that a third portion of said output member travels along a substantially rectilinear path as said carrier member is rotated by said rotating means from a first angular position to a second angular position.

2. The device of claim 1 further comprising a stationary support member, said stationary drive member being mounted to said stationary support member.

3. The device of claim 1 wherein said second support member translates toward and away from said carrier member.

4. The device of claim 1 wherein said output member comprises a pair of arms held substantially parallel to each other and connected to said first and said second support members.

5. The device of claim 1 wherein said stationary drive member has a diameter approximately four times greater than a diameter of said driven member, such that said driven member rotates approximately once during a 90 degree rotation of said carrier member.

6. The device of claim 1 wherein said rotating means comprises a reversible motor.

7. A mechanical loading device for generating an output motion from a rotational input, said mechanical loading device comprising:

a stationary support member;

a stationary drive member mounted on said stationary support member;

a carrier member rotatably supported on said stationary support member;

means for rotating said carrier member on said stationary support member, said means for rotating being connected to said carrier member;

a driven member rotatably supported on said carrier member, said driven member mechanically connected with said stationary drive member such that said driven member rotates relative to said carrier member when said carrier member is rotated on said stationary support member by said rotating means;

a first support member eccentrically mounted to said driven member;

a second support member slidably mounted proximate said carrier member and linearly displaceable relative to said carrier member;

an output member having a first portion rotatably mounted to said second support member and a second portion rotatably mounted to said first support member, such that a third portion of said output member travels along a defined path as said carrier member is rotated by said rotating means from a first angular position to a second angular position; and a load handler mounted to said output member.

8. The mechanical loading device of claim 7 wherein said stationary support member comprises a shaft having an axis which is substantially parallel to an axis of rotation of said rotating means.

9. The mechanical loading device of claim 7 wherein said stationary drive member and said carrier member are concentrically mounted on said stationary support member.

10. The mechanical loading device of claim 7 wherein said stationary drive member and said driven member are disposed within said carrier member.

11. The mechanical loading device of claim 7 further comprising a guide member, said second support member being mounted on said guide member and linearly displaceable toward and away from said carrier member.

12. The mechanical loading device of claim 7 wherein said output member comprises a pair of arms held substantially parallel to each other and connected to said first and said second support members.

13. The mechanical loading device of claim 7 wherein said stationary drive member has a diameter approximately four times greater than a diameter of said driven member, and wherein said driven member rotates approximately once during a 90 degree rotation of said carrier member.

14. The mechanical loading device of claim 7 wherein said rotating means comprises a variable speed, reversible motor.

15. The mechanical loading device of claim 7 further comprising a second driven member mounted to said carrier member, said second driven member mechanically engaging said rotating means for rotating said carrier member.

16. The mechanical loading device of claim 15 wherein said rotating means comprises a drive belt engaged with said second driven member.

17. A device for generating a substantially rectilinear output motion from a rotational input, said device comprising:

a support frame;

a stationary shaft mounted to said support frame;

a drive pulley nonrotatably mounted to said stationary shaft;

a carrier member rotatably mounted to said stationary shaft concentric with said drive pulley, said carrier member rotating from a first angular position to a second angular position;

a first driven pulley secured to said carrier member;

a reversible motor mechanically connected with said first driven pulley for rotating said carrier member on said stationary shaft;

a second driven pulley rotatably supported on said carrier member, said second driven pulley mechanically connected with said drive pulley such that said second driven pulley rotates relative to said carrier member when said carrier member is rotated on said stationary shaft by said reversible motor, said drive pulley having a diameter approximately four times greater than a diameter of said second driven pulley such that said second driven pulley rotates approximately once during a 90 degree rotation of said carrier member, said second driven pulley having an eccentric shaft interconnected therewith;

a first support yoke mounted on said eccentric shaft of said second driven pulley;

a second support yoke slidably mounted on said support frame, said second support yoke traveling along a linear path toward and away from said carrier member; and an output member having a first end rotatably mounted to said second support yoke and an intermediate portion rotatably mounted to said first support yoke, such that a second end of said output member travels along a substantially rectilinear path as said carrier member is rotated by said reversible motor from said first angular position to said second angular position;

whereby said rectilinear path commences at said first angular position of said carrier member and terminates at said second angular position of said carrier member.

18. The device of claim 17 wherein said output member comprises a pair of substantially parallel arms each connected to said first and said second support yokes.

19. The device of claim 17 wherein said drive pulley and said second driven pulley are disposed within said carrier member.

20. The device of claim 17 further comprising a first belt for engaging said first driven pulley with said reversible motor, and a second belt for engaging said second driven pulley with said drive pulley.

* * * * *

UNITED STATES PATENT AND TRADEMARK OFFICE
CERTIFICATE OF CORRECTION

PATENT NO. : 5,536,136
DATED : July 16, 1996
INVENTOR(S) : Arthur C. Mason

It is certified that error appears in the above-indentified patent and that said Letters Patent is hereby corrected as shown below:

Column 2, line 44, delete "devices" insert ---- device ----.

Column 5, line 52, delete "will,rotate" insert ---- will rotate ----.

Column 6, line 3, delete "Of the" insert ---- of the ----.

Signed and Sealed this

Fourth Day of February, 1997

Attest:

BRUCE LEHMAN

*Attesting Officer*          *Commissioner of Patents and Trademarks*